United States Patent [19]

Onda et al.

[11] 4,373,601
[45] Feb. 15, 1983

[54] POWER TRANSMISSION DEVICE OF MOTORCYCLES

[75] Inventors: Takanori Onda, Kawagoe; Hiroshi Kawasaki, Tokorozawa; Mitsukuni Misawa, Tokyo, all of Japan

[73] Assignee: Honda Giken Kogyo Kabushiki Kaisha, Tokyo, Japan

[21] Appl. No.: 188,365

[22] Filed: Sep. 18, 1980

[30] Foreign Application Priority Data

Sep. 25, 1979 [JP] Japan .................. 54-123031

[51] Int. Cl.³ .................. B62M 11/06; B62M 17/00
[52] U.S. Cl. .................. 180/226; 74/337.5; 74/745; 180/70 MS; 180/230
[58] Field of Search .............. 180/219, 226, 227, 230, 180/293, 70 MS; 74/333, 337.5, 355, 366, 336, 371, 372, 473 R, 473 P, 745

[56] References Cited

U.S. PATENT DOCUMENTS

| Re. 26,608 | 6/1969 | Hopkins | 180/230 |
| 2,241,002 | 5/1941 | Peterson | 74/745 |
| 3,421,384 | 1/1969 | Okamota et al. | 74/337.5 |
| 3,435,708 | 4/1969 | Honda et al. | 74/745 |
| 3,438,277 | 4/1969 | Okamoto | 74/745 |
| 3,457,798 | 7/1969 | Musgrave | 74/337.5 |
| 3,739,656 | 6/1973 | Williams et al. | 74/337.5 |

FOREIGN PATENT DOCUMENTS

| 162400 | 4/1955 | Australia | 180/226 |
| 499910 | 6/1930 | Fed. Rep. of Germany | 180/219 |

*Primary Examiner*—Joseph F. Peters, Jr.
*Assistant Examiner*—Ross Weaver
*Attorney, Agent, or Firm*—Posnack, Roberts, Cohen & Spiecen

[57] ABSTRACT

A power transmission device of a motorcycle comprising a main transmission case formed integrally with an engine crank case and accommodating a main transmission, and a sub-transmission case provided at the rear side of the main mission case. The sub-transmission case accommodates a sub-transmission which is drivingly connected to the main transmission and also to a rear wheel of the motorcycle through a transmission mechanism. The transmission mechanism and the sub transmission are disposed at opposite sides of the rear wheel. The sub-transmission case is composed of a case body and a cover for covering an opening of the case body. The opening is formed at a lateral side of the gears of the sub-transmission so that the gears are accessible and replaceable by removing the cover from the opening.

15 Claims, 7 Drawing Figures

FIG. 3
FIG. 4
FIG. 5
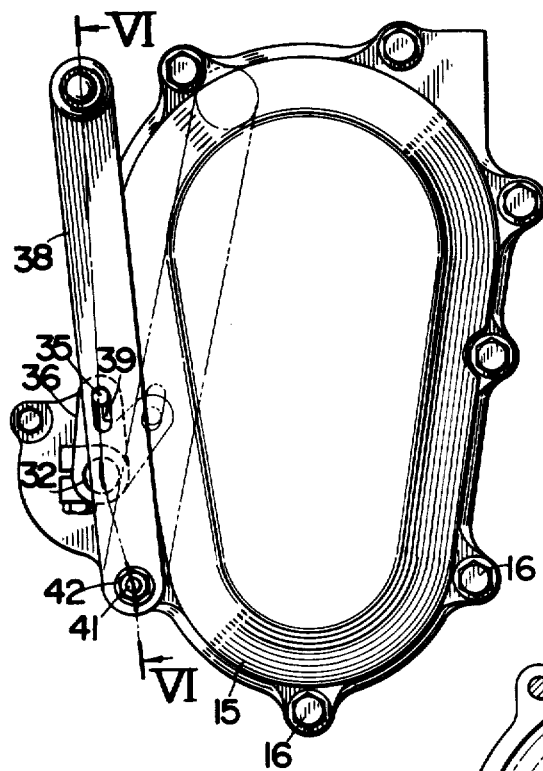
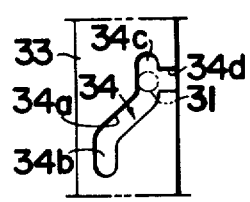
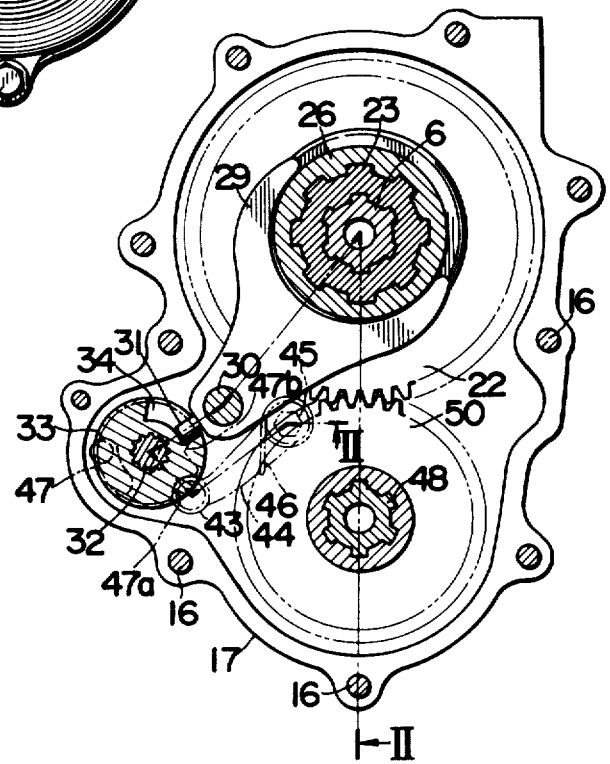

POWER TRANSMISSION DEVICE OF MOTORCYCLES

BACKGROUND OF THE INVENTION

1. Field of the Invention

The present invention relates to a power transmission device of a motorcycle, for transmitting the power of an engine mounted on the chassis frame to the rear wheel.

2. Description of the Prior Art

Generally, the power transmission device for motorcycle is adapted to transmit the power of the engine to a rear wheel through a clutch mechanism, a transmission and then through a chain or a shaft drive mechanism.

Motorcycles, however, are often required to cruise, depending on the uses and applications, at a speed which is not covered by the range of the aforesaid transmission.

SUMMARY OF THE INVENTION

Under these circumstances, the present invention aims at satisfying the above-stated requirement of the prior art.

It is an object of the invention to provide a power transmission device for motorcycles in which a sub-transmission is interposed between the aforementioned transmission and the chain or the shaft drive mechanism to provide a wider range of speed change by combining the range covered by the ordinary transmission and the range covered by the sub-transmission, thereby to fulfill the above-mentioned aim, while avoiding the deterioration of the running performance and stability of the motorcycle due to the addition of the sub-transmission by arranging the sub-transmission in a good balance of weight with other parts of the transmission system.

It is another object of the invention to provide a transmission device having a sub-transmission gear train which is designed an constructed to permit and easy replacement of the sub-transmission gear train, so that the reduction ratio of the transmission device as a whole can easily be changed without necessitating the demounting and disassembling of the transmission device which is inevitably required in the conventional transmission device.

It is still another object of the invention to provide a power transmission device having a reduced number of parts and which is easy to assemble.

BRIEF DESCRIPTION OF THE DRAWINGS

FIG. 3 is a side elevational view of the embodiment shown in FIG. 2;

FIG. 4 is a sectional view taken along line IV—IV in FIG. 2;

FIG. 5 is an exploded view of a cam groove of a shift drum cam;

DESCRIPTION OF THE PREFERRED EMBODIMENTS

Figure 1:
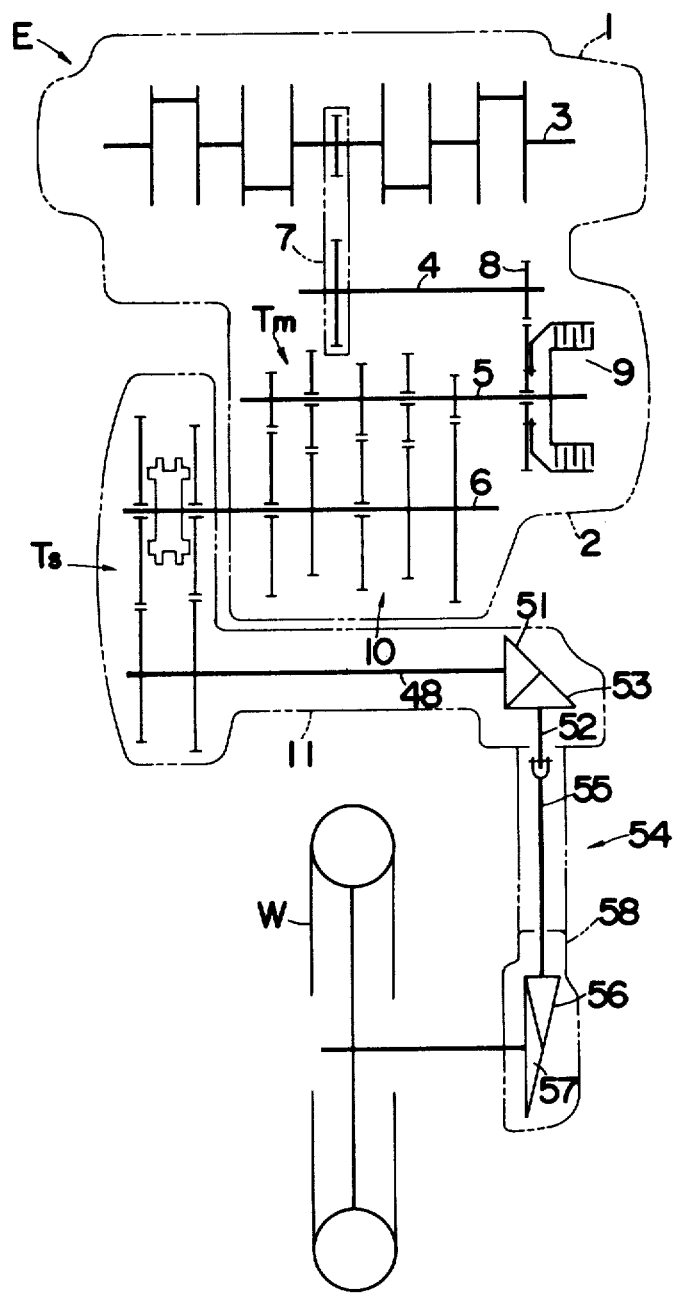
FIG. 1 is a schematic plan view of a power transmission system of a motorcycle constructed in accordance with an embodiment of the invention.

A first embodiment of the invention will be described hereinunder with reference to FIGS. 1 through 6. An engine E of a motorcycle has a crank case 1 and a main transmission case 2 formed integrally with each other. A crank shaft 3 is rotatably mounted in the crank case 1. A main transmission Tm is accommodated in the main transmission case 2. The main transmission Tm includes a primary shaft 4, main shaft 5 and a counter shaft 6, which are mounted in parallel relation in the main transmission case 2. The primary shaft 4 is drivingly connected to the crank shaft 3 through a chain mechanism 7 arranged therebetween. The main shaft 5 is drivingly connected to the primary shaft 4 through a gear mechanism 8 and a clutch mechanism 9. Finally, the counter shaft 6 is drivingly connected to the main shaft 5 through a gear train 10. The power of the engine E is transmitted to the counter shaft 6, through the crank shaft 3, chain mechanism 7, primary shaft 5 and the gear train 10. The reduction ratio between the crank shaft 3 and the counter shaft 6 is changed in an ordinary manner by the changing operation of the aforesaid main transmission Tm. The output end 6' of the counter shaft 6 projects out of the main transmission case 2.

The power transmitting arrangement between the crank shaft 3 and the counter shaft 6 is not described in detail because it is well known per se.

Figure 2:
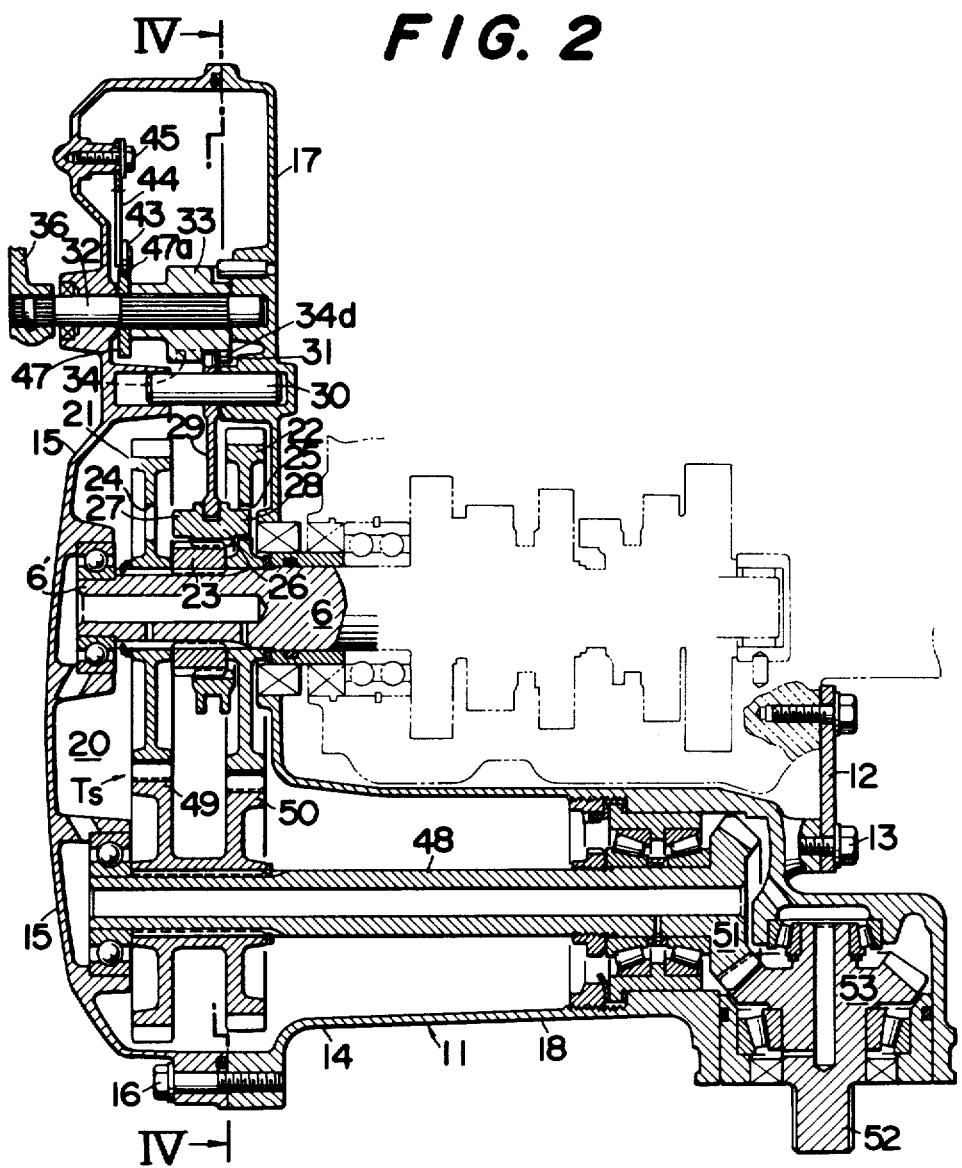
FIG. 2 is a sectional view of an essential part of an embodiment of the invention, taken along line II—II in FIG. 4.

As will be clearly understood from FIG. 2, a substantially L-shaped sub-transmission case 11 is detachably attached by means of bolts 13 to the rear side of the main transmission case 2 through a support member 12.

The sub-transmission case 11 is compose of a case body 14 and a cover 15 attached to an opened portion of the case body 14 by means of bolts 16. The case body 14 has a front half part 17 extending along one side wall of the main transmission case 2 in the front and rear directions of the chassis frame and a rear half part 18 extending in the right and left directions along the rear wall of the main transmission case 2. These half parts are formed integrally with each other. The aforementioned cover 15 is fitted to an opening formed in the front half part 17 so as to cooperate with the latter to form a gear accommodating space 20. The output end 6' of the counter shaft 6 projects into the space 20 and is rotatably carried by the cover 15.

A sub-transmission Ts is mounted in the sub-transmission case 11. The construction of this sub-transmission Ts will be explained hereafter with reference to FIG. 2. First and a second drive gears 21, 22 are rotatably mounted on the output end 6' of the counter shaft 6. A shifter boss 23 is splined to the counter shaft 6 between gears 21,22 so as to rotate as a unit with the counter shaft 6. A first hole 24 and a second hole 25 are formed in disc portions of the first and second drive gears 21,22 at the same radius. A shifter 26 is splined to the outer periphery of the shifter boss 23 and is axially slidable with respect thereto. First and second projections 27,28 formed on both sides of the shifter 26 are adapted to fit in the first and second holes 24,25 selectively.

The arrangement is such that, as the shifter 26 is moved to the left in FIG. 2, the first projection 27 is inserted into the first hole 24, whereas the rightward movement of the shifter 26 brings the second projection 28 into engagement with the second hole 25. A shift fork 29, which is rotatably carried by a shaft 30, is secured at one end to the shifter 26. The shift fork 29 has a shift pin 31 projected from the other end thereof. The shift pin 31 is received in a cam groove 34 formed in the outer peripheral surface of a shift drum 33 which is splined to a spindle 32 rotatably supported by the sub-transmission case 11.

Figure 6:
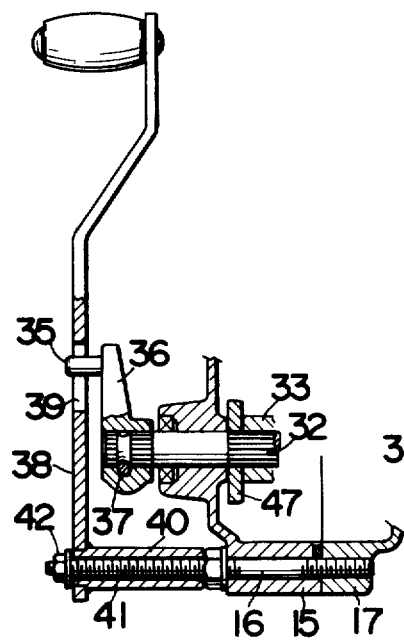
FIG. 6 is a sectional view taken along the line VI—VI in FIG. 3.

As will be seen from FIGS. 3 and 6, an arm 36 having an engaging pin 35 extending from one end thereof is splined and secured by a stopper pin 37 to the end of the spindle 32 extending outward from the cover 15. The engaging pin 35 of the arm 36 is engaged in an elongated longitudinal slot 39 formed at an intermediate portion of the shift lever 38 by making use of one of the attaching bolts 16. Thanks to this arrangement, it becomes possible to reduce the rotation angle of the arm 36 for a given rotation angle of the shift lever 38 as compared with the case where the shift lever 38 is directly attached to the spindle 32, so that the operability is improved considerably.

As shown in FIG. 6, a tubular member 40 is formed integrally with the shift lever 38 at the base end thereof. The tubular member 40 is fitted onto a screw shaft 41 extending unitarily from one of the attaching bolts 16 and is fastened to the screw shaft 41 by means of a nut 42.

The cam groove 34 formed in the periphery of the shift drum 32 is inclined at its central portion 34a as shown in FIG. 5, and is provided at its both ends with engaging portions 34b, 34c extending in the circumferential direction therefrom. One of the portions 34c is open laterally by a notch groove 34d. Therefore, as the shift drum 33 is rotated by operation of the shift lever 38, the shift fork 29 is moved in the axial direction along the cam groove 34 so that the shifter 26 is moved to the left or right to fit the first or second projection 27,28 into the first or second hole 24,25.

A drum stopper 44 rotatably carrying a roller 43 at its end is pivotally secured at 45 to the cover 15. The drum stopper 44 is biased by a spring 46 to rotate in the clockwise direction around a pivot point 45, as viewed in FIG. 4, so that the roller 43 is pressed against the outer periphery of the shift drum 33. Splined to the spindle 32 is an annular member 47 which is provided on its outer periphery with a pair of grooves 47a, 47b. When the roller 43 is in engagement with the groove 47a or 47b, the shift drum 33 is held at a predetermined rotational position. In this state, the engaging pin 35 of the shift fork 29 is held in one of engaging portions 34b or 34c formed at opposite ends of the cam groove 34.

The rear half part 18 of the sub-transmission case 11 extends laterally of the chassis frame and transversely of the portion just ahead of the rear wheel W of the motorcycle. A transmission shaft 48 extending substantially parallel with the counter shaft 6 is mounted rotatably in the rear half part 18 of the sub-transmission case 11. First and second driven gears 49,50 formed as a unit with each other are splined to one end of the transmission shaft 48 so as to rotate as a unit with the latter but is axially movably along the same.

The first driven gear 49 and the second driven gear 50 are always in mesh with the first drive gear 21 and the second drive gear 22, respectively. The opening formed in the front half part 17 of the sub-transmission case 11 opens at the lateral side of the first and second drive gears 21,22 so that the first and second drive gears 21,22 and the first and second driven gears 49,50 can be withdrawn from the counter shaft 6 and the transmission shaft 48, respectively, so that these gears are replaceable for any desired reduction ratio.

A driving bevel gear 51 is formed unitarily at the other end of the transmission shaft 48. A short driver shaft 52 orthogonal to the transmission shaft 48 is rotatably carried by the other end (right end as viewed in FIG. 2) of the sub-transmission case 11, and carries a driven bevel gear 53 formed unitarily therewith and meshing with the aforementioned driving bevel gear 51.

As will be seen from FIG. 1, a shaft drive transmission mechanism 54 is connected to the transmission shaft 48 at the side of the main transmission case 2 opposite the sub-transmission Ts. More specifically, a drive shaft 55 extending in the longitudinal direction of the chassis frame is coupled at its front end through a joint to the driven shaft 52.

The rear end of the drive shaft 55 is connected to the rear wheel W through a pair of final bevel gears. 56,57. The final bevel gears 56,57 and the drive shaft 55 are accommodated in a transmission case 58. The rear wheel W is located substantially at the mid point between the gear train of the sub-transmission Ts and the shaft drive transmission mechanism 54 in the lateral direction, so that the center of gravity of the gear train and the shaft drive transmission mechanism is located substantially on the rear wheel W.

In operation of the power transmission device of the described first embodiment, the counter shaft 6 is driven through the main transmission Tm by the crank shaft 3 of the engine E. As the shift lever 38 is operated to move the shifter 26 to the left in FIG. 2, the first projection 27 comes to be received by the first hole 24 so that the first drive gear 21 is directly coupled to the counter shaft 6, and the rotation of the counter shaft 6 is transmitted to the transmission shaft 48 through the shifter boss 23, shifter 26, first drive gear 21 and the first driven gear 49, so that the rotation speed of the counter shaft 6 is secondarily reduced before it is transmitted to the transmission shaft 48. The rotation of the transmission shaft 48 is finally transmitted to the rear wheel W through the bevel gears 51,53, driven shaft 52, drive shaft 55 and the final bevel gears 56,57.

As the shifter 26 is moved to the right as viewed in FIG. 2, the second projection 28 fits in the second hole 25 so that the second drive gear 22 is coupled to the counter shaft 6 to transmit the rotation of the latter to the transmission shaft 48 through the shifter boss 23, shifter 26, second drive gear 22 and the second driven gear 50. In this state, the rotation speed of the counter shaft is transmitted to the transmission shaft 48 at a reduction ratio which is different from that mentioned before. The reduced speed is then transmitted through the shaft drive transmission mechanism 54 to the rear wheel W to drive the latter.

For obtaining different speed reduction ratios from those explained above, the cover 15 is detached from the case body 14 and the pair of gear trains of the sub-transmission are withdrawn from the counter shaft 6 and the transmission shaft 48 for replacement with another pair of gear trains having different reduction ratios. Then, the cover 15 is attached again to the case body 14.

Figure 7:
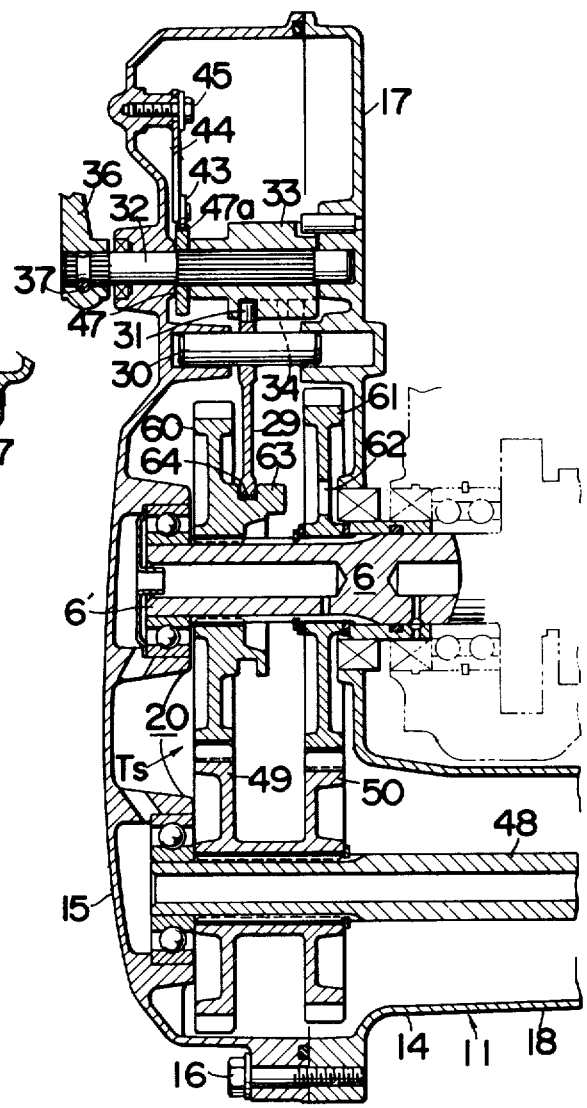
FIG. 7 is a cross-sectional plan view of a second embodiment of the invention.

Referring now to FIG. 7 showing a second embodiment of the invention, a first drive gear 60 on the counter shaft 6 serves also as a shifter. Namely, the first drive gear 60 is splined to the counter shaft 6 for axial sliding motion along the shaft 6, and a second drive gear 61 is loosely mounted on the counter shaft 6 for relative rotation. A hole 62 formed in the disc portion of the second drive gear 61 is adapted to selectively receive a projection 63 formed on the disc portion of the first drive gear 60. Also, the first drive gear 60 is provided with an annular groove 64 adapted to receive the shift fork 29. When the first drive gear 60 has been shifted to the left position as illustrated in FIG. 7, this gear meshes with the first driven gear 49 on the transmission shaft 48, so that the rotation of the counter shaft 6 is transmitted to the transmission shaft 48 through the first drive gear 60 and the first driven gear 49. To the contrary, as the first drive gear 60 takes the right position in FIG. 7, the second drive gear 61 is coupled to the counter shaft 6 through the first drive gear 60, so that the rotation of the counter shaft 6 is transmitted to the transmission shaft 48 through the first drive gear 60, second drive gear 61 and the second driven gear 50.

Other portions of this second embodiment than specifically mentioned above are materially identical to those of the first embodiment and designated by the same references.

Although in the described embodiments the power is transmitted from the sub-transmission Ts to the rear wheel W through shaft drive transmission mechanism 54, it is possible, needless to say, to substitute a chain drive transmission mechanism for the shaft drive transmission mechanism.

As will be understood from the foregoing description, the transmission device of the invention provides a wide range of speed change, by the combination of the speed changing range of the main transmission and that presented by the sub-transmission which is interposed between the main transmission connected to the crank shaft of the engine and the transmission mechanism connected to the rear wheel.

At the same time, since the sub-transmission and the transmission mechanism connected to the rear wheel are arranged at opposite sides of the rear wheel, the weights of these units are balanced at a point substantially on the rear wheel so that the balance of weight of the motorcycle is maintained to ensure a high stability of the same during running.

In addition, the reduction ratio of the sub-transmission can easily be changed by replacing the gears as a unit simply by detaching the cover, so that the overall reduction ratio can be widely and quite easily changed as compared with the conventional transmission device having only the main transmission thereby to enhance the utility of the motorcycle.

Since the first and second drive gears of the sub-transmission have mutually engageable portions and a shifter for shifting the second drive gear is formed unitarily with the latter to eliminate the necessity of a separate shifter, the number of parts of the sub-transmission is reduced to simplify the construction and to reduce the production cost.

What is claimed is:

1. A power transmission device for a motorcycle having an engine contained in a crank case and a rear wheel driven from the engine, said power transmission device comprising a main transmission case integrally formed with the engine crank case and extending longitudinally rearwards thereof, a main transmission mounted in said main transmission case, a sub-transmission case disposed in part at one side in the transverse direction of said main transmission case, a sub-transmission mounted in said sub-transmission case and drivingly connected to said main transmission, said sub-transmission being disposed at said one side in the transverse direction of said main transmission case, and means for drivingly connecting said sub-transmission to the rear wheel of the motorcycle, said means being disposed at the other side in the transverse direction of said main transmission case so that said means and said sub-transmission are transversely offset on opposite sides of said rear wheel.

2. A power transmission device as claimed in claim 1 wherein said means and said sub-transmission have a center of gravity located substantially on the rear wheel.

3. A power transmission device as claimed in claim 2 wherein said sub-transmission case extends in part at the rear of said main transmission case and is of L-shape.

4. A power transmission device as claimed in claim 1, wherein said sub-transmission case comprises a case body having an opening and a cover detachably attached to said case body for closing said opening, said case body and said cover cooperating with each other to define therebetween a space for accommodating gears of said sub-transmission, said opening being provided at a lateral side of said gears of said sub-transmission to permit the withdrawal of said gears by detaching said cover.

5. A power transmission device as claimed in claim 1 wherein said main transmission includes a counter shaft projecting from said main transmission case into said sub-transmission case, said sub-transmission including at least one first drive gear axially movably splined on said counter shaft of said main transmission, first and second driven gears, said first drive gear being engageable and disengageable with said first driven gear, at least one second drive gear rotatably mounted on said counter shaft and always meshing with said second driven gear, a shifter integrally formed with said first drive gear and engageable with said second drive gear, and shifting means for shifting said shifter together with said first drive gear axially along said counter shaft to place said shifter into or out of engagement with said second drive gear and at the same time to place said first drive gear in disengagement from or engagement with said first driven gear.

6. A power transmission device as claimed in claim 1 wherein said main transmission includes a counter shaft projecting from said main transmission case into said sub-transmission case, said sub-transmission including first and second drive gears rotatably mounted on said counter shaft, first and second driven gears, said first and second drive gears always meshing with said first and a second driven gears, respectively a shifter applied to said counter shaft for axial sliding movement therealong, and shifting means for shifting said shifter axially along said counter shaft into selective engagement with one of said first and second drive gears.

7. A power transmission device as claimed in claim 5 or 6 wherein said shifting means comprises a spindle rotatably carried by said sub-transmission case, a shift lever operatively connected to said spindle for rotating the latter, and a shift fork operatively connecting said spindle with said shifter so that said shifter is axially displaced along said counter shaft upon rotation of said spindle caused by said shift lever.

8. A power transmission device as claimed in claim 7 wherein said sub-transmission case includes a case body in which said counter shaft extends, said case body having a cover, and fastener means detachably attaching said cover to said body to cover said opening.

9. A power transmission device as claimed in claim 8 wherein said shift lever is pivotally secured to said cover through said fastening means and a slot and pin link mechanism connecting said shaft lever to said spindle.

10. A power transmission device as claimed in claim 9 wherein said slot and pin link mechanism comprises an elongated slot in said shift lever extending in the longitudinal direction of the latter, and a link fixed at one end to said spindle and provided at its other end with a pin engaging in said elongated slot.

11. A power transmission device as claimed in claim 7 wherein said shifting means further includes a shift drum splined to said spindle for rotation therewith and provided in its outer periphery with a cam groove, and a shift pin on said shift fork engaged in said cam groove.

12. A power transmission device as claimed in claim 11 wherein said shifting means further comprises holding means for resiliently holding said shift drum at any desired rotational position.

13. A power transmission device as claimed in claim 12 wherein said holding means comprises a stopper member pivotally secured at one end to said sub-transmission case and resiliently urged at its other end against the outer periphery of said shift drum.

14. A power transmission device as claimed in claim 13 wherein said sub-transmission case comprises a case body in which said counter shaft extends and having an opening, and a cover detachably attached to said case body to close said opening, said spindle carrying said shift drum being secured to said cover of said sub-transmission together with said stopper member.

15. A power transmission device as claimed in claim 11 wherein said cam groove in the periphery of said shift drum is open at one side of said shift drum.

* * * * *